United States Patent
Johnson et al.

(10) Patent No.: US 10,627,852 B2
(45) Date of Patent: Apr. 21, 2020

(54) SYNCHRONIZED SWITCHING OF VOLTAGE REGULATORS IN AN INFORMATION HANDLING SYSTEM

(71) Applicant: DELL PRODUCTS, L.P., Round Rock, TX (US)

(72) Inventors: Ralph H. Johnson, Round Rock, TX (US); Stuart A. Berke, Austin, TX (US); Lei Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 104 days.

(21) Appl. No.: 15/435,946

(22) Filed: Feb. 17, 2017

(65) Prior Publication Data

US 2018/0239390 A1    Aug. 23, 2018

(51) Int. Cl.
*G06F 1/10* (2006.01)
*G06F 1/26* (2006.01)
*G06F 1/28* (2006.01)

(52) U.S. Cl.
CPC ............ *G06F 1/10* (2013.01); *G06F 1/26* (2013.01); *G06F 1/28* (2013.01)

(58) Field of Classification Search
CPC .............. G06F 1/10; G06F 1/26; G06F 1/28
See application file for complete search history.

(56) References Cited

U.S. PATENT DOCUMENTS

| 6,819,577 | B1 | 11/2004 | Wiktor et al. | |
| 7,368,959 | B1 | 5/2008 | Xu et al. | |
| 2004/0232964 | A1* | 11/2004 | Wiktor | H02J 1/102 327/172 |
| 2005/0001597 | A1 | 1/2005 | Walters et al. | |
| 2007/0262759 | A1 | 11/2007 | Burton et al. | |
| 2012/0091977 | A1* | 4/2012 | Carroll | H02M 3/1584 323/271 |
| 2015/0076903 | A1* | 3/2015 | Kanayama | H02J 3/40 307/24 |
| 2015/0355698 | A1* | 12/2015 | Luo | G06F 1/28 702/62 |

OTHER PUBLICATIONS

Intersil Technical Article "How to Improve DC/DC Converter Performance with Phase Shifting Time Delay", Intersil.com, 2015.

\* cited by examiner

*Primary Examiner* — Fred E Finch, III
*Assistant Examiner* — Rafael O. De León Domenech
(74) *Attorney, Agent, or Firm* — Isidore PLLC (57) ABSTRACT

A method and system for synchronized switching of voltage regulators in an IHS. The method includes determining, via a master voltage regulator (VR) controller, a plurality of phase shifts for a plurality of VRs configured as a master VR and at least one slave VR. The phase shifts are determined such that the VRs switch at different times from each other. A common clock signal and the phase shifts are transmitted to each of the slave VRs.

16 Claims, 8 Drawing Sheets

SYNCHRONIZED SWITCHING OF VOLTAGE REGULATORS IN AN INFORMATION HANDLING SYSTEM

BACKGROUND

1. Technical Field

The present disclosure generally relates to information handling systems and in particular to synchronized switching of voltage regulators in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of switching voltage regulators to provide low voltage power to processors, memory, input/output adapters, hard drives, and other devices. Numerous voltage regulators are provided on a single motherboard and are connected to a common power plane with a common voltage. The voltage regulators typically switch at frequencies of several hundred kilohertz at high currents. If the voltage regulators switch substantially concurrently, the voltage regulators can cause a problem due to the additive noise generated by the simultaneous switching. Noise can be injected into the common power plane during voltage regulator switching due to (1) current ripple at the voltage regulator switching frequency and (2) high frequency noise spikes occurring at the switching moment of the power metal oxide semi-conductor field effect transistors (MOSFET) due to parasitic capacitance and inductance in the power switching path. Input chokes can be used with each individual voltage regulator and bulk capacitors added to the power plane to reduce noise. The use of input chokes and bulk capacitors takes up additional space on the motherboard, causes power losses and adds additional cost to the system.

BRIEF SUMMARY

Disclosed are a method, a power supply system, and an information handling system (IHS) for synchronized switching of voltage regulators (VRs) in an IHS.

According to one embodiment, the method comprises determining, via a master VR controller, a plurality of switching frequencies and associated phase shifts for a plurality of VRs configured as a master VR and at least one slave VR. The switching frequencies and associated phase shifts are determined such that the VRs switch at different times from each other. A clock signal is transmitted to the master VR and each of the slave VRs through a common clock bus and phase shift information is transmitted to the master VR and to each of the slave VRs through a digital communication interface.

According to another embodiment, a power control system comprises a power subsystem that is configured to be coupled to and supply power to functional components of an IHS. The power subsystem including a master VR, at least one slave VR, and a board management controller (BMC). The master VR is communicatively coupled to the slave VRs and the BMC. The master VR further includes a master VR controller. The master VR controller has VR synchronization firmware executing thereon that configures the master VR controller to determine a plurality of switching frequencies and associated phase shifts for a plurality of VRs configured as a master VR and the at least one slave VR. The switching frequencies and associated phase shifts are determined such that the VRs switch at different times from each other. A clock signal is transmitted to the master VR and each of the slave VRs through a common clock bus and phase shift information is transmitted to the master VR and to each of the slave VRs through a digital communication interface.

Also disclosed is an IHS that comprises a processor and a power subsystem communicatively coupled to the processor and to functional components of the IHS. The power subsystem includes a master VR, at least one slave VR and a BMC. The master VR is communicatively coupled to the slave VRs and the BMC. The master VR further includes a master VR controller. The master VR controller has VR synchronization firmware executing thereon that configures the master VR controller to determine a plurality of switching frequencies and associated phase shifts for a plurality of VRs configured as a master VR and the at least one slave VR. The switching frequencies and associated phase shifts are determined such that the VRs switch at different times from each other. A clock signal is transmitted to the master VR and each of the slave VRs through a common clock bus and phase shift information is transmitted to the master VR and to each of the slave VRs through a digital communication interface.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

The illustrative embodiments provide a method, a power supply system, and an information handling system (IHS) for synchronized switching of voltage regulators in an IHS. The method includes determining, via a master voltage regulator (VR) controller, a plurality of switching frequencies and associated phase shifts for a plurality of VRs configured as a master VR and at least one slave VR. The switching frequencies and associated phase shifts are determined such that the VRs switch at different times from each other.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
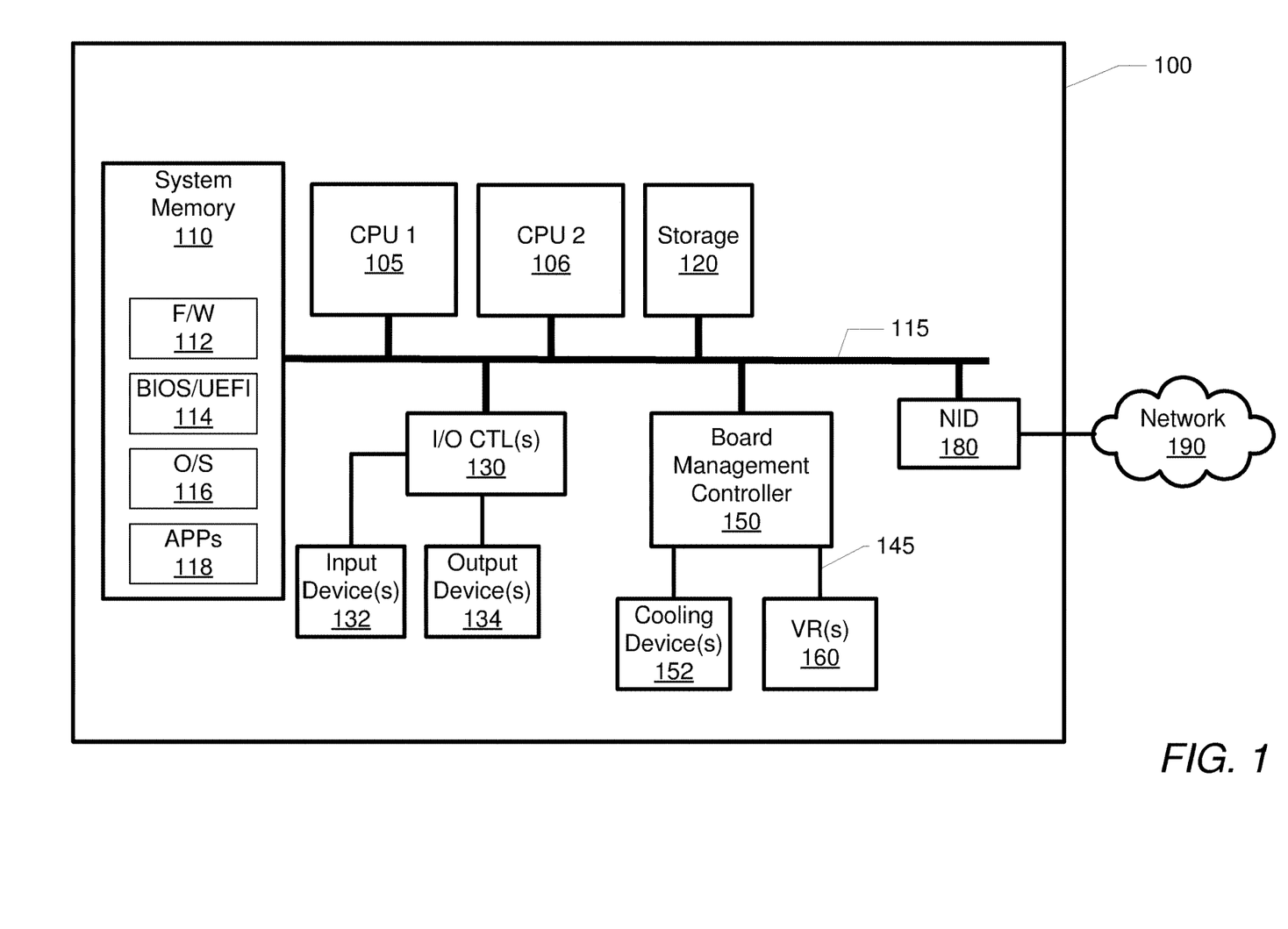
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processors or central processing units (CPU) such as CPU 1 105 and CPU 2 106 that are coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and is thus illustrated as and can be more completely referred to as BIOS/UEFI in these embodiments. The various software and/or firmware modules have varying functionality when their corresponding program code is executed by one or more of CPU 1 105 and CPU 2 106 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

Additionally, in one or more embodiments, IHS 100 includes a board management controller (BMC) 150, cooling devices (CDs) 152, and one or more voltage regulators (VRs) 160. BMC 150 is in communication with processor(s) 105 and system memory 110 via system interconnect 115. BMC 150 contains components that control specific operations of IHS 100 such as power and thermal management. BMC 150 is in communication with CDs 152 and VRs 160. CDs 152 can be one or more air movers, such as fans, that are positioned to cool IHS 100 during operation of IHS 100. The one or more VRs 160, collectively referred to as VRs 160, supply respective voltage and current levels to functional components of IHS 100, such as processor(s) 105 and system memory 110. VRs 160 are communicatively coupled to BMC 150 via a digital communication connection 145 such as an I2C bus or a power management (PM) bus. VRs 160 contain components that at least partially enable synchronized switching of the VRs to prevent simultaneous switching of multiple VRs at the same time.

IHS 100 further comprises a network interface device (NID) 180. NID 180 enables IHS 100 to communicate and/or interface with other devices, services, and components that are located external to IHS 100. These devices, services, and components can interface with IHS 100 via an external network, such as example network 190, using one or more communication protocols. Network 190 can be a local area network, wide area network, personal area network, and the like, and the connection to and/or between network and IHS 100 can be wired or wireless or a combination thereof. For purposes of discussion, network 190 is indicated as a single collective component for simplicity. However, it is appreciated that network 190 can comprise one or more direct connections to other devices as well as a more complex set of interconnections as can exist within a wide area network, such as the Internet.

Figure 2:
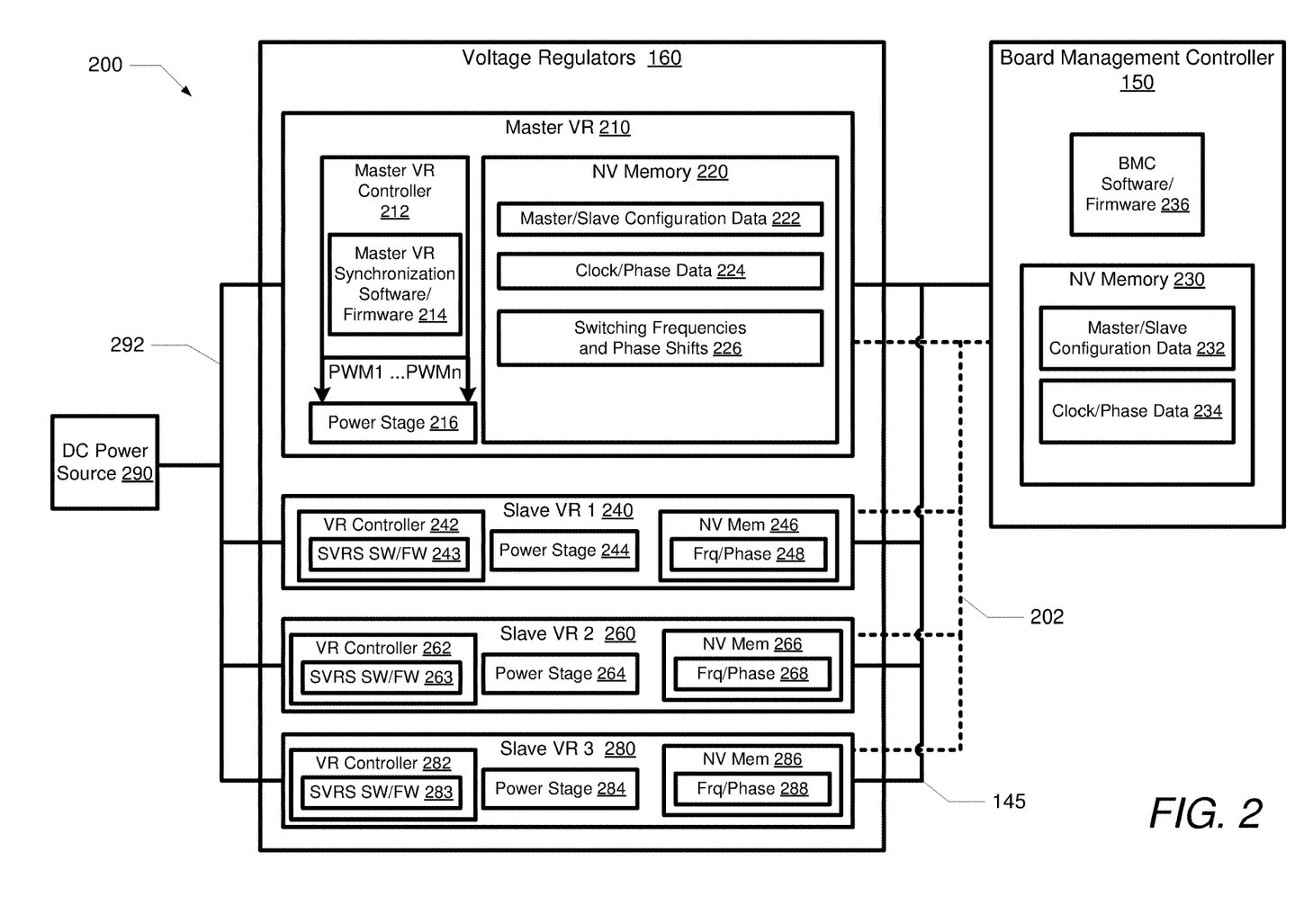
FIG. 2 illustrates a component level view of a power sub-system including voltage regulators, a board management controller, and other functional components that support synchronized switching of voltage regulators, in accordance with one embodiment.

With reference now to FIG. 2, there is shown an exemplary power subsystem 200 that implements a method of synchronized switching of VRs. In the discussion of FIG. 2 and the following figures, the description of each figure can include general reference to the specific components illustrated within the preceding figures. Power subsystem 200 comprises BMC 150, VRs 160, and DC power source 290. BMC 150 is coupled to VRs 160 via a digital communication connection 145 such as an I2C bus or a PMbus and also a common clock bus 202. BMC 150 can transmit and receive data from VRs 160 via digital communication connection 145.

VRs 160 include several different VRs that provide power to IHS 100 at several different voltages, currents, and power levels. In the illustrated embodiment, VRs 160 comprise master VR 210, slave VR 1 240, slave VR 2 260, and slave VR 3 280. In one embodiment, master VR 210 can provide the main input voltage to CPU 1 105 (CPU 1 Vcore) (FIG. 1). Slave VR 1 240 can provide a memory system voltage for system memory 110 (Vmemory 1). Slave VR 2 260 can provide the main input voltage to CPU 2 106 (CPU 2 Vcore) (FIG. 1). Slave VR 3 280 can provide another memory system voltage for system memory 110 (Vmemory 2) (FIG. 1). A direct current (DC) power source 290 is connected to master VR 210, slave VR 1 240, slave VR 2 260, and slave VR 3 280 via a power bus 292. DC power source 290 supplies input power to the VRs. Master VR 210, slave VR 1 240, slave VR 2 260, and slave VR 3 280 are all connected to a digital communication connection 145 such as an I2C bus or PMBus and common clock bus 202. BMC 150 can communicate with each VR via digital communication connection 145.

BMC 150 includes BMC software/firmware 236, which can control functions of BMC 150, and a non-volatile (NV) memory 230. NV memory 230 contains master/slave configuration data 232 and common clock signal/phase data 234. Master/slave configuration data 232 contains pre-determined designations for which of VRs 160 are to be assigned as the master VR and which are to be assigned as slave VRs. In another embodiment, the VRs 160 assigned as the master VR and slave VRs can be dynamically assigned and/or changed by the VRs. Common clock signal/phase data 234 contains the common clock signal frequency for the VRs and the number of phases for each of the VRs.

As one exemplary embodiment, master VR 210 can include master VR controller 212, power stage 216, and master VR NV memory 220 (which can be part of the VR controller or a separate entity). Master VR controller 212 can control one or more functions of master VR 210. Master VR controller 212 can control the output of power stage 216, determine switching frequencies and time delays or phase shifts, and selectively control a common clock signal supplied to the slave VRs. Master VR controller 212 can control the output of power stage 216 via several pulse width modulation (PWM1-PWMn) signals. In one embodiment, master VR controller 212 comprises master VR synchronization software/firmware 214 that configures each of the VRs to switch at a different time such that noise on the input power system is minimized. Master VR synchronization software/firmware 214 prevents simultaneous switching of the VRs at the same time. Simultaneous switching of the VRs can create additional injected noise into the input power system or power plane of IHS 100.

Master VR NV memory 220 can contain master/slave configuration data 222, clock/phase data 224, and switching frequencies and phase shifts 226. In one embodiment, master/slave configuration data 222 is received from BMC 150 and contains pre-determined designations for which of VRs 240, 260 and 280 are to be assigned as slave VRs. In another embodiment, master/slave configuration data 222 is pre-determined and directly stored in master VR NV memory 220. Common clock signal/phase data 224 is received from BMC 150 and contains the common clock signal frequency for the VRs and number of phases for each of the VRs. Master VR controller 212 supplies the common clock signal based on clock signal data 224. Switching frequencies and time delays or phase shifts 226 are calculated or determined by master VR controller 212 to synchronize switching times of the VRs so that the individual VR phases do not switch simultaneously.

Slave VR 1 240 can include slave VR controller 242, power stage 244, and slave VR NV memory 246 (which can be part of the VR controller or a separate entity). Slave VR controller 242 comprises slave VR synchronization (SVRS)

software/firmware/hardware 243 that causes slave VR 1 240 to switch, based on the common clock frequency (via common clock bus 202) and phase shift (via communication bus 145) communicated to it such that noise on the input power system is minimized. Slave VR controller 242 can control one or more functions of slave VR 1 240. Slave VR controller 242 can control the output of power stage 244 which provides power at a switching frequency and phase shift for the voltage provided by slave VR 1 240. Slave VR NV memory 246 can contain switching frequency and phase data 248 that is received from master VR 210 for the operation of slave VR 1 240.

Slave VR 2 260 can include slave VR controller 262, power stage 264 and slave VR NV memory 266. Slave VR controller 262 comprises SVRS software/firmware/hardware 263 that causes slave VR 2 260 to switch, based on common clock frequency (via common clock bus 202) and phase shift (via communication bus 145) communicated to it such that noise on the input power system is reduced. Slave VR controller 262 can control one or more functions of slave VR 2 260. Slave VR controller 262 can control the output of power stage 264 to provide power at a switching frequency and phase shift for the voltage provided by slave VR 2 260. NV memory 266 can contain switching frequency and phase data 268 that is received from master VR 210 for the operation of slave VR 2 260.

Slave VR 3 280 can include slave VR controller 282, power stage 284 and NV memory 286. Slave VR controller 282 comprises SVRS software/firmware/hardware 283 that causes slave VR 3 280 to switch, based on common clock frequency (via common clock bus 202) and phase shift (via communication bus 145) communicated to it such that noise on the input power system is reduced. Slave VR controller 282 can control one or more functions of slave VR 3 280. Slave VR controller 282 can control the output of power stage 284 to provide power at a switching frequency and phase shift for the voltage provided by slave VR 3 280. NV memory 286 can contain switching frequency and phase data 288 that is received from master VR 210 for the operation of slave VR 3 280.

In one embodiment, master VR controller 212 can determine switching frequencies and phase shifts 226 for the master VR 210 and the slave VRs 240, 260 and 280. The switching frequencies and phase shifts are arranged such that the VRs switch at different times from each other. Master VR controller 212 transmits the clock signal (via common clock bus 202), whose frequency is the common denominator of all the switching frequencies and the phase shifts (via communication bus 145) to the slave VRs 240, 260 and 280.

In another embodiment, BMC 150 can determine switching frequencies and phase shifts 226 for the VRs 210, 240, 260 and 280. In this example, all of the VRs 210, 240, 260 and 280 would be slave VRs and would receive operating instructions from BMC 150. The switching frequencies and phase shifts are arranged such that the VRs switch at different times from each other. BMC 150 can transmit the clock and the phase shifts to the VRs 210, 240, 260 and 280.

In an additional embodiment, two or more of the slave VRs can be assembled together in a group. Several slave VRs can be arranged in a point of load (POL) group or configuration nearby a load of IHS 100. In this example, VR controller 212 determines a switching frequency and phase shifts for the group as a whole. Each of the slave VRs in the group is assigned with an evenly distributed phase shift between each other.

Figure 3:
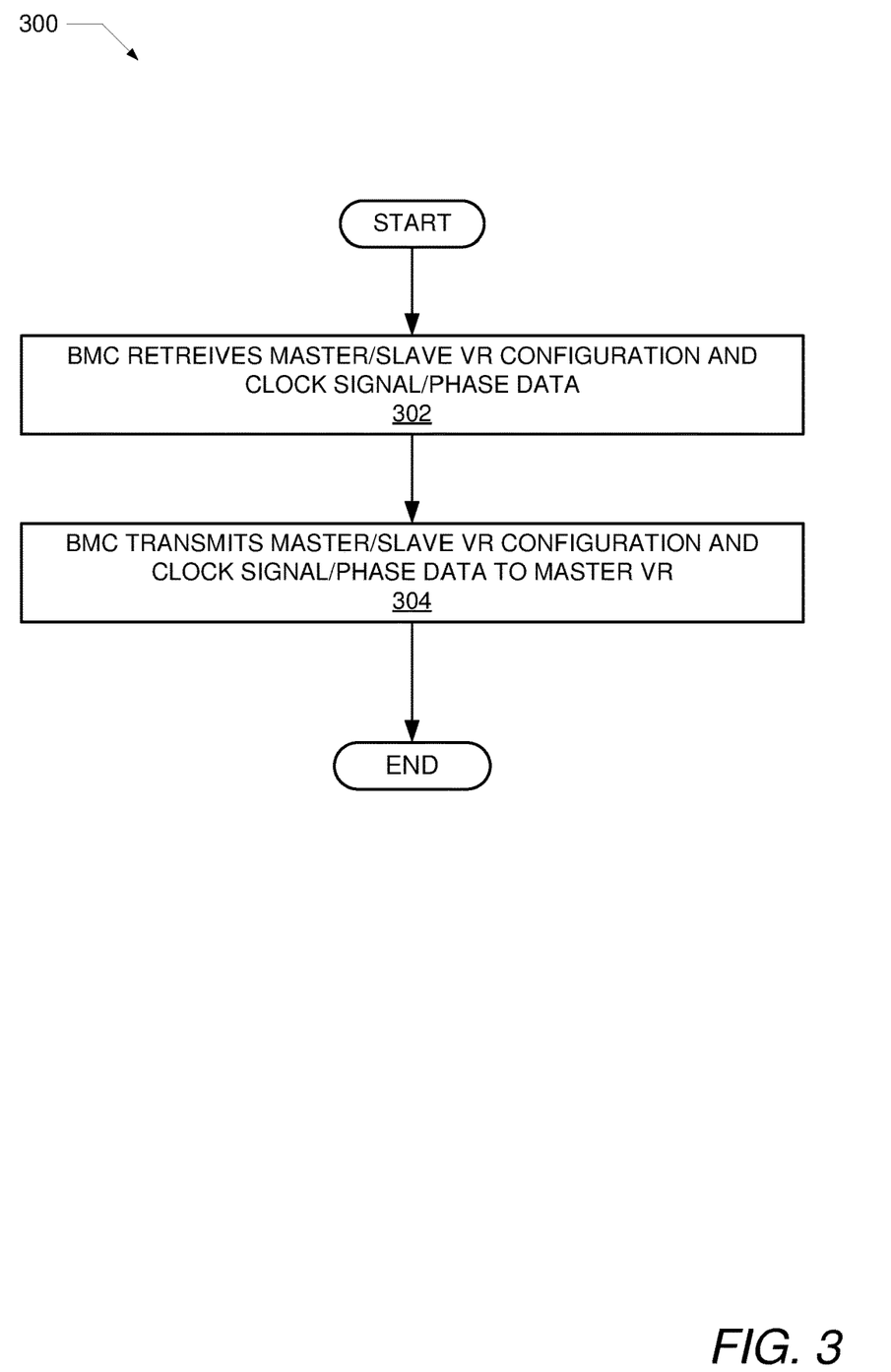
FIG. 3 is a flow chart illustrating an example of a method by which a board management controller enables synchronized switching of voltage regulators in an information handling system, according to one or more embodiments.
Figure 4:
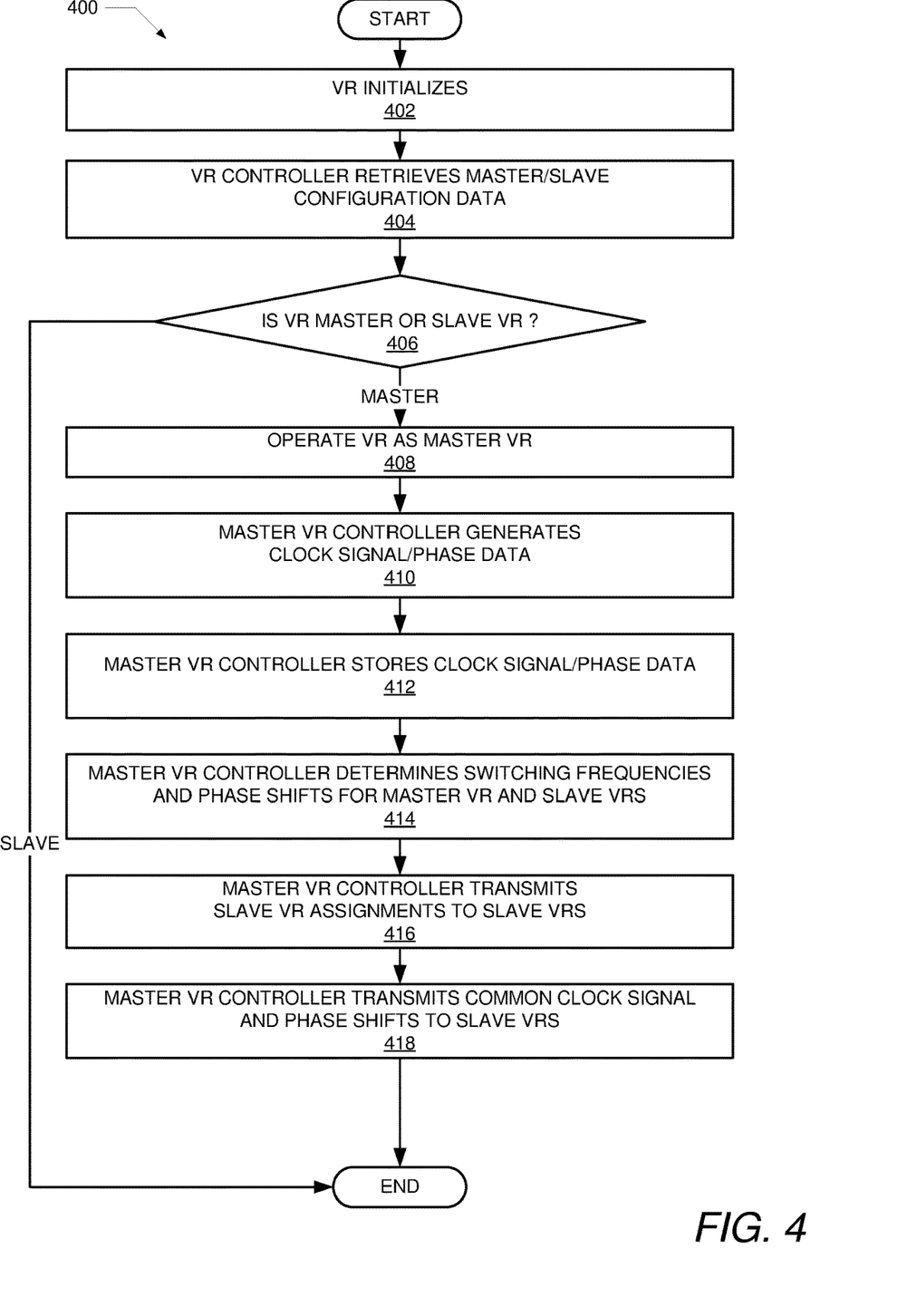
FIG. 4 is a flow chart illustrating an example of a method by which a master voltage regulator controller enables synchronized switching of voltage regulators in an information handling system, according to one or more embodiments.
Figure 5:
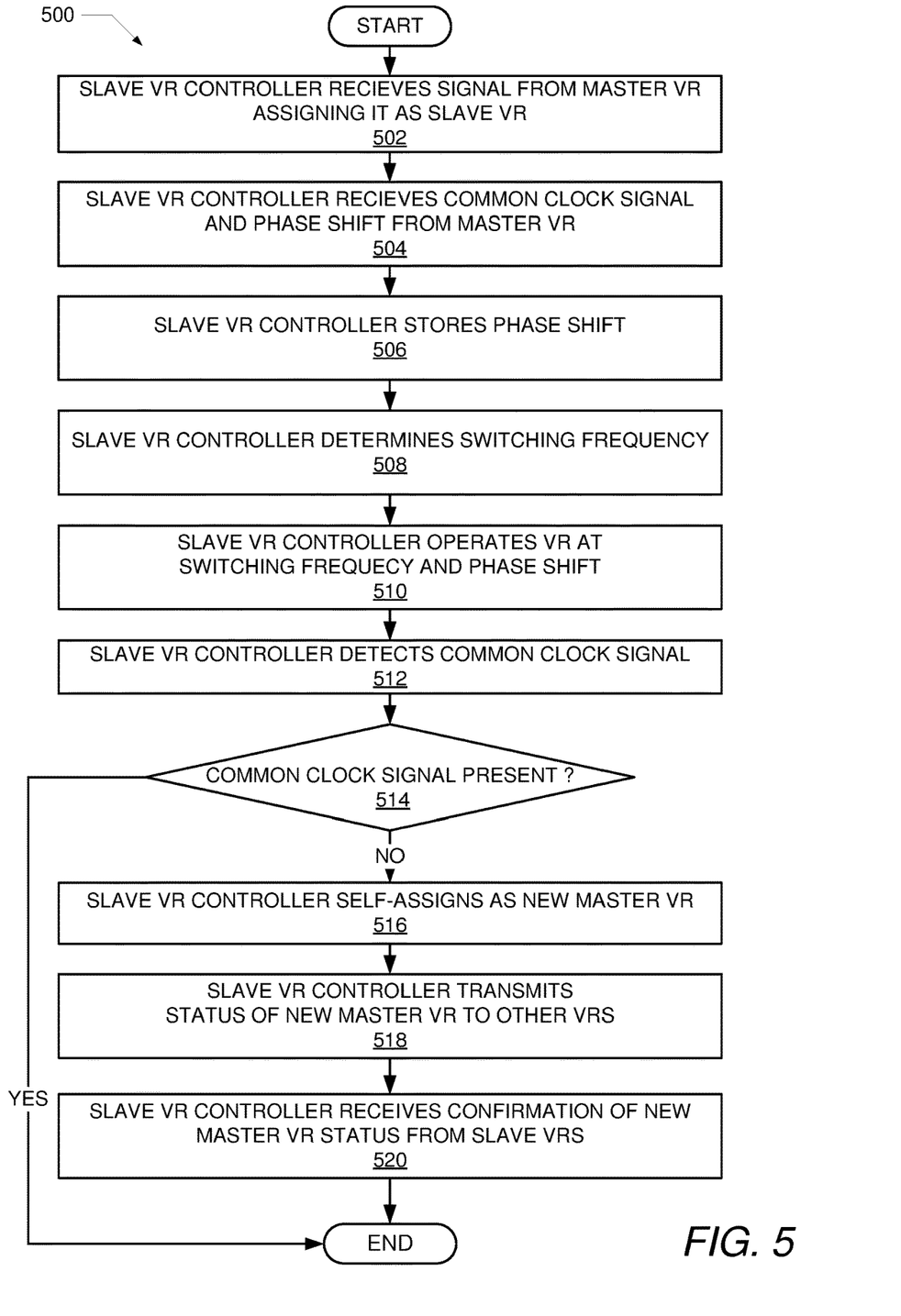
FIG. 5 is a flow chart illustrating an example of a method by which a slave voltage regulator controller enables synchronized switching of voltage regulators in an information handling system, according to one or more embodiments.

FIGS. 3, 4, and 5 illustrate flowcharts of exemplary methods by which power subsystem 200 within the preceding figures performs different aspects of the processes that enable the one or more embodiments of the disclosure. Generally, method 300 represents a method by which BMC 150 transmits data to a master VR. Method 400 represents a method by which master VR controller 212 determines switching frequencies and phase shifts for the master VR and the slave VRs. Method 500 represents a method by which the slave VR controllers 242, 262 and 282 become new master VR controller in case of a master VR failure.

The description of each method is provided with general reference to the specific components illustrated within the preceding FIGS. 1-5. Generally, method 300 is described as being implemented via the execution of code provided by BMC software/firmware 236 acting within BMC 150. Method 400 is described as being implemented via the execution of code provided by master VR synchronization software/firmware 214 acting within master VR controller 212. Method 500 is described as being implemented via the execution of code provided by slave VR synchronization software/firmware 243 acting within slave controller 242. It is however appreciated that certain aspects of the described methods may be implemented via other processing devices and/or execution of other code.

With specific reference to FIG. 3, method 300 begins at the start block and proceeds to block 302 where BMC 150 retrieves master/slave configuration data 232 and clock signal/phase data 234. BMC 150 transmits the master/slave configuration data and the clock signal/phase data to the master VR 210 (block 304) where the data are stored to NV memory 220. Method 300 then ends.

FIG. 4 illustrates details of method 400 by which master VR controller 212 determines switching frequencies and phase shifts for the master VR and the slave VRs. Method 400 begins at the start block and proceeds to block 402 where master VR controller 212 initializes master VR 210. Master VR controller 212 retrieves master/slave configuration data 222 from NV memory 220 (block 404). Master VR controller 212 determines if master VR 210 has been assigned as the master VR (decision block 406). In response to master VR 210 not being assigned as the master VR, method 400 ends. In response to master VR 210 being assigned as the master VR, master VR controller 212 operates master VR 200 in a master VR mode (block 408). Master VR controller 212 generates clock/phase data 224. In another embodiment, clock/phase data 224 can be pre-determined and stored in NV memory 220 or can be received from BMC 150. Clock/phase data 224 includes a common clock signal that is used to synchronize switching of the VRs and prevent drift over time.

Master VR controller 212 stores clock/phase data 224 (block 412). At block 414, master VR controller 212 determines a time or phase shift for each of the VRs 210, 240, 260 and 280. In another embodiment, the phase shifts can be pre-determined and stored in NV memory 220. Master VR controller 212 determines the time delays or phase shifts for the VRs such that the VRs switch at different times from each other, preventing simultaneous switching of the VRs. Master VR controller 212 transmits the slave VR assignments to the slave VRs (block 416) and transmits the common clock signal, and phase shifts 226 to the slave VRs 240, 260 and 280 (block 418). During operation, the common clock signal is continuously broadcast by master VR controller 212 on common clock bus 202. Method 400 then terminates.

FIG. 5 illustrates details of method 500 that enables slave VR controller 242 to operate slave VR 1 240 at a switching frequency and phase shift. Method 500 begins at the start block and proceeds to block 502 where slave VR controller 242 receives a signal from master VR controller 212, via communication bus 145, assigning slave VR 1 240 as a slave VR. Slave VR controller 242 receives the common clock signal and phase shift for slave VR 240 from master VR controller 212 (block 504). Slave VR controller 242 stores the phase shift for slave VR 240 to slave NV memory 246 as freq/phase data 248 (block 506). Slave VR controller 242 determines a switching frequency for slave VR 1 240 based on the common clock signal (block 508). Slave VR controller 242 operates the slave VR 240 at the determined switching frequency and received phase shift (block 510).

At block 512, slave VR controller 242 detects the common clock signal on the clock bus 202. Master VR controller 212 transmits the common clock signal on the clock bus 202. Slave VR controller 242 determines if the common clock signal has been detected (i.e. is present) (decision block 514). In response to the common clock signal being present, method 500 ends. In response to the common clock signal not being present, slave VR controller 242 self-assigns VR 1 240 as the new master VR (block 516). Slave VR controller 242 transmits the status of VR 1 240 as the new master VR to the other VRs and triggers the other VRs to respond with a confirmation of the new master VR (block 518). Slave VR controller 242 receives confirmation from the other VRs that VR 1 240 is the new master VR (block 520). Method 500 then terminates.

Figure 6:
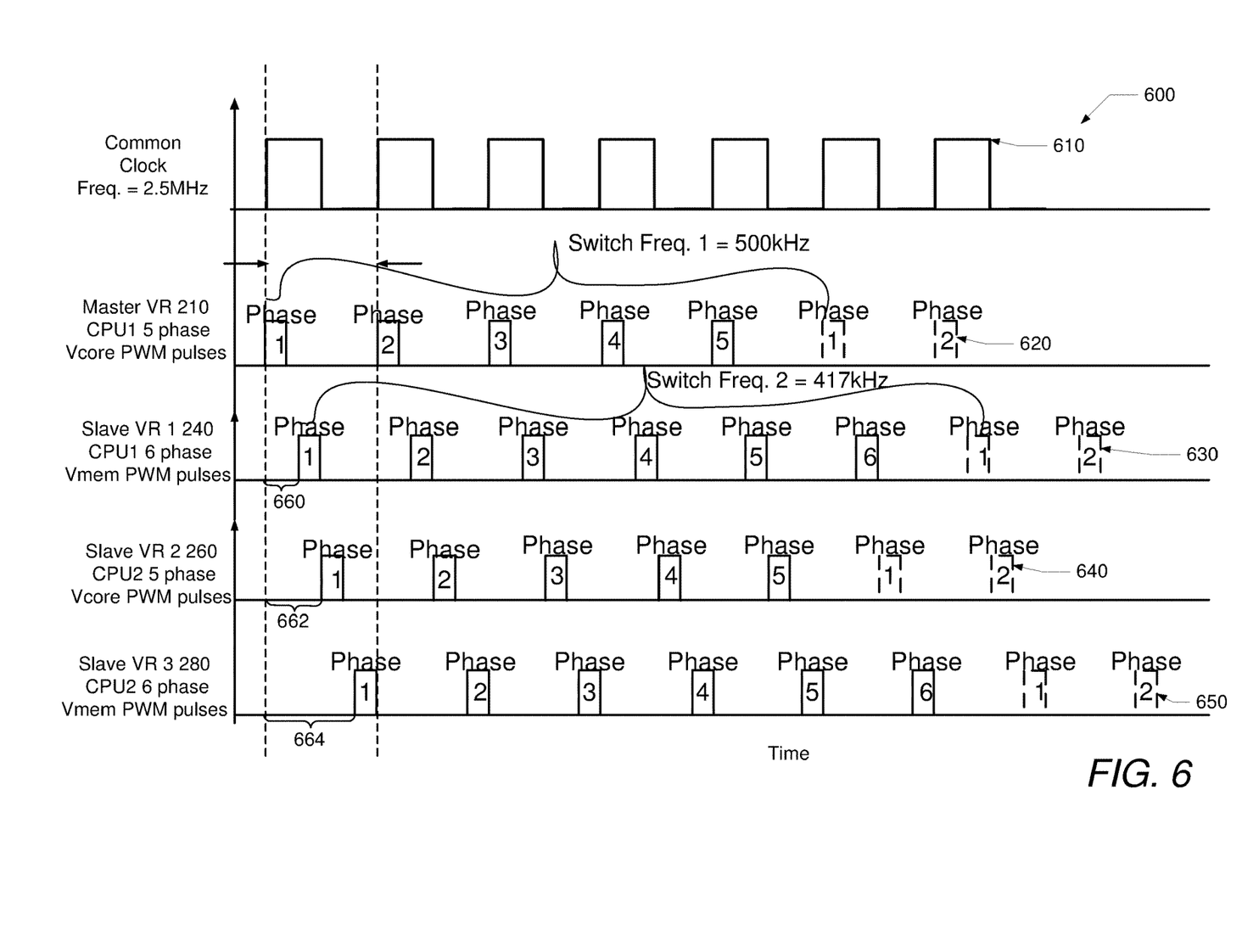
FIG. 6 is a graph of PWM pulses versus time for several voltage regulators illustrating different switching frequencies and phase shifts, in accordance with one embodiment.

FIG. 6 illustrates a graph 600 of a multi-phase VR per-phase PWM pulses versus time for VRs 210, 240, 260 and 280 illustrating the different switching frequencies and phase shifts. Graph 600 includes a common clock signal 610 that has an example frequency of 2500 Kilo-Hertz (kHz). The multi-phase Master VR 210 can provide central processing unit (CPU) 1 Vcore voltage 620, which has 5 total number of phases and a switching frequency for each phase of 500 kHz. Multi-phase Slave VR 1 240 can provide CPU 1 Vmemory voltage 630, which has 6 total number of phases and a switching frequency for each phase of 417 kHz. Multi-phase Slave VR 2 260 can provide central processing unit (CPU) 2 Vcore voltage 640, which has 5 total number of phases and a switching frequency of 500 kHz. Multi-phase Slave VR 3 280 can provide CPU 2 Vmemory voltage 650, which has 6 total number of phases and a switching frequency of 417 kHz.

Each of the VRs is assigned with an evenly distributed phase shift between each other, such that none of the individual phase high-side MOSFET switching moments overlap. Slave VR 1 voltage 630 has a phase shift 660 from the start of the common clock signal 610. Slave VR 2 voltage 640 has a phase shift 662 from the start of the common clock signal 610. Slave VR 3 voltage 650 has a phase shift 664 from the start of the common clock signal 610.

Master VR controller 212 can determine the switching frequency for the master VR and the phase shifts 660, 662 and 664 for the slave VRs. The switching frequencies and phase shifts are arranged such that the VRs switch at different times from each other. Master VR controller 212, executing master VR synchronization software/firmware 214, can cause each of the VRs to switch at a different time such that noise on the input power system is minimized. Master VR controller 212 prevents simultaneous switching of the VRs at the same time, thereby minimizing VR switching noise within the power system of IHS 100. The use of master VR controller 212 executing master VR synchronization software/firmware 214 allows for a reduction in the number of input chokes required for the VRs and also reduces the number of bulk capacitors required to achieve a given noise level.

Figure 7A:
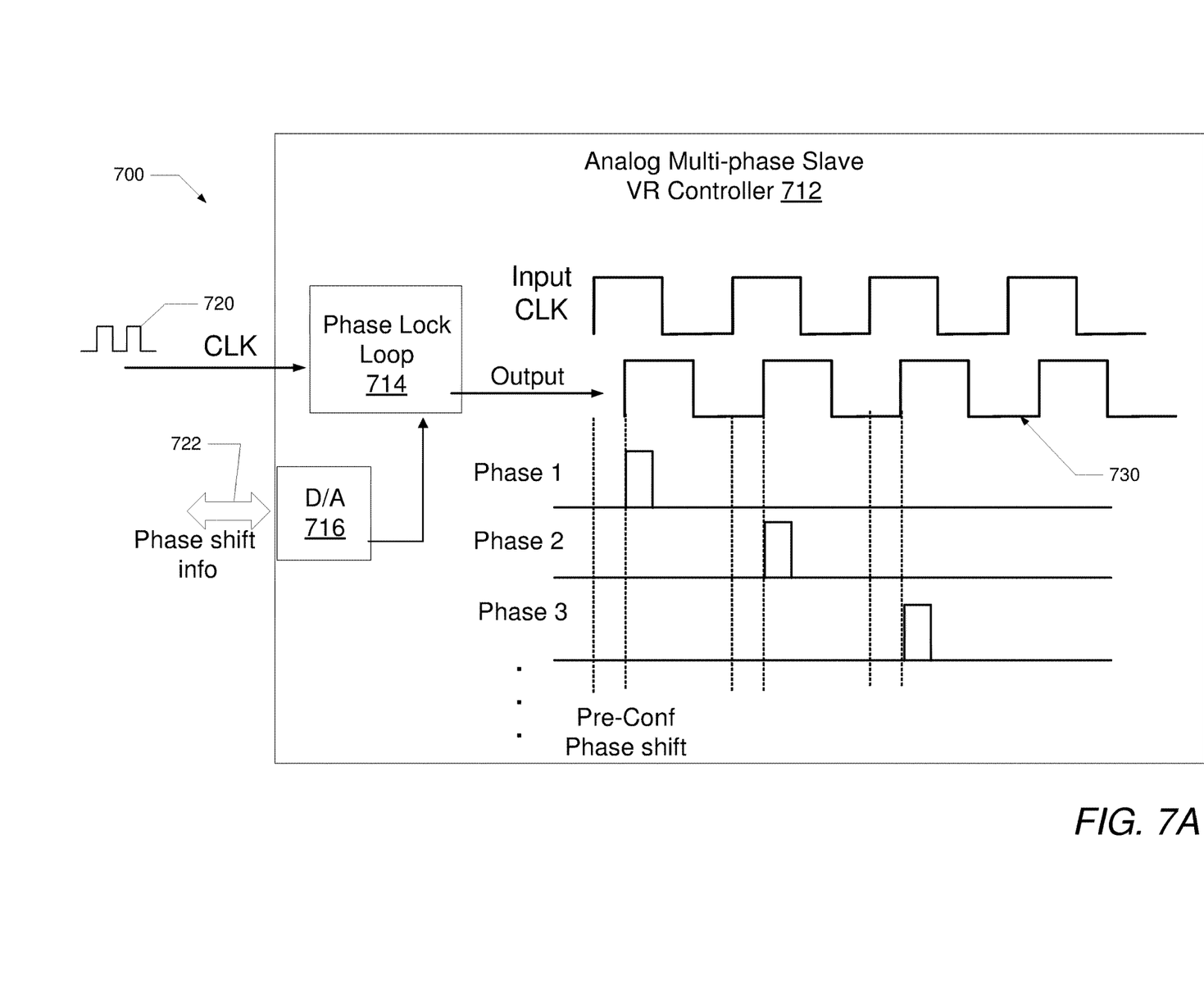
FIG. 7A is a diagram of an analog slave voltage regulator controller illustrating phase delays during operation.

FIG. 7A illustrates a diagram 700 of one embodiment of an analog slave VR controller 712. Analog slave VR controller 712 includes a phase lock loop circuit 714 and a digital to analog (D/A) converter 716. Analog slave VR controller 712 receives two signals from master VR controller 212. One signal is the common clock signal 720 received via a common clock bus coupled to phase lock loop circuit 714, and the other signal is the phase shift data or information 722 received via a digital communication connection coupled to D/A converter 716. Analog slave VR controller 712 uses the common clock signal in a phase lock loop and converts the digital phase shift information 722 into an analog signal through D/A converter 716. The phase lock loop circuit 714 combines the common clock signal and the analog phase shift information to generate the phase delayed output 730. The phase delayed output 730 has same common clock frequency, but has a phase delays. The slave VR uses the phase delayed output 730 for every phase to generate PWM pulses to the power stage 244 (FIG. 2).

Figure 7B:
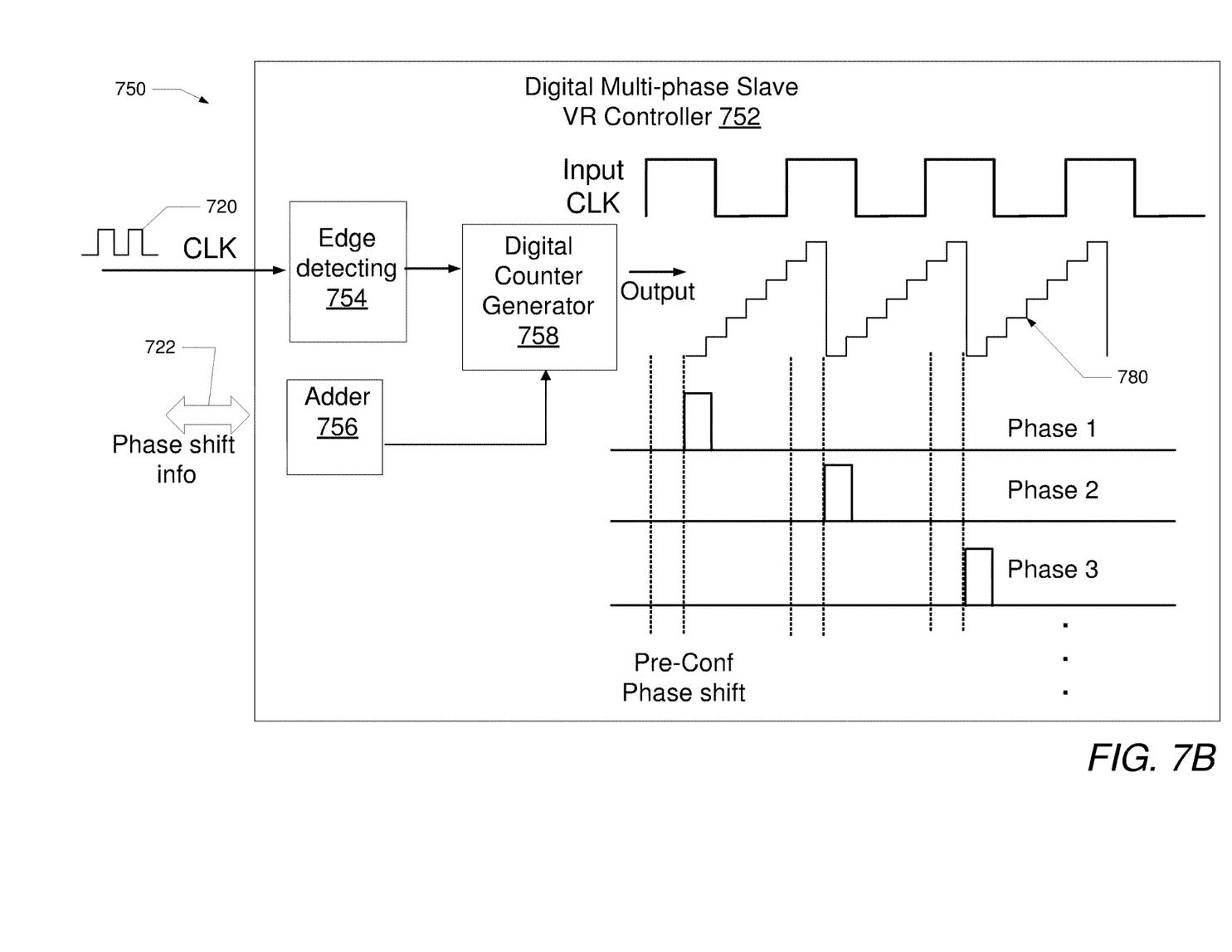
FIG. 7B is a diagram of a digital slave voltage regulator controller illustrating phase delays during operation.

FIG. 7B illustrates a diagram 750 of one embodiment of a digital slave VR controller 752. Digital slave VR controller 752 includes an edge detecting circuit 754, an adder circuit 756 and a digital counter generator 758. Digital slave VR controller 752 receives two signals from master VR controller 212. One signal is the common clock signal 720 received via a common clock bus coupled to edge detecting circuit 754, and the other signal is the phase shift data or information 722 received via a digital communication connection coupled to adder 756. The edge detecting circuit 754 generates a synchronized trigger at every rising edge of the common clock signal 720. The digital counter generator 758 combines the trigger and the digital phase shift information to generate a digital delayed output signal 780. The digital counter generator 758 generates a step up counter signal which has same frequency as the common clock signal, but also includes a phase delay. The phase delayed output 780 has same common clock frequency, but has a phase delay. The slave VR uses the phase delayed output 780 for every phase to generate PWM pulses to the power stage 244 (FIG. 2).

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for synchronized switching of voltage regulators (VR(s)) in an information handling system (IHS), the method comprising:
    receiving, at a master VR controller, from a non-volatile (NV) memory of a board management controller (BMC), master/slave configuration data to each of a plurality of VRs via a digital communication interface and clock signal/phase data via a common clock bus, the master/slave configuration data identifying one of the plurality of VRs as a master VR and each other VR as a slave VR, the master slave configuration data assigning, as the master VR, the one VR identified by the master/slave configuration data as the master VR;
    determining, via the master VR controller of the VR assigned as the master VR, a plurality of switching frequencies and associated phase shifts for the plurality of VRs configured as the master VR and at least one slave VR, the phase shifts determined such that each of the plurality of VRs switch at different times from each other; and
    transmitting, to each of the slave VRs, from the master VR controller, the associated phase shifts.

2. The method of claim 1, further comprising:
    assigning slave VRs identified by the master/slave configuration data as the slave VRs.

3. The method of claim 1, further comprising:
    receiving, via a first slave VR controller, a first phase shift for a first slave VR;
    determining, via the first slave VR controller, a first switching frequency for the first slave VR; and operating the first slave VR at the first switching frequency and first phase shift.

4. The method of claim 1, further comprising transmitting, from the master VR controller through a common clock bus, a common clock signal to each of the slave VRs.

5. The method of claim 1, further comprising:
determining, via a first slave VR controller associated with a first slave VR, if a common clock signal has failed; and
in response to the common clock signal having failed, self-assigning the first slave VR as a new master VR.

6. The method of claim 1, wherein the transmitting comprises transmitting the switching frequencies and associated phase shifts through a digital communication interface interconnecting the master VR and each of the at least one slave VR, the digital communication interface being separate from the common clock bus.

7. A power control system comprising:
a power subsystem configured to be coupled to and supply power to functional components of an information handling system (IHS), the power subsystem including a master voltage regulator (VR), at least one slave VR, and a board management controller (BMC), the master VR communicatively coupled to each of the at least one slave VR and the BMC via both a common clock bus and a digital communication interface, the master VR further including a master VR controller, the master VR controller having VR synchronization firmware executing thereon that configures the master VR controller to:
receive, from a non-volatile (NV) memory of the BMC, master/slave configuration data for one or more of the plurality of VRs via the digital communication interface and clock signal/phase data via a common clock bus, the master/slave configuration data identifying one of the plurality of VRs as a master VR and each other VR as a slave VR, and the master VR controller assigning, as the master VR, the one VR identified by the master/slave configuration data as the master VR;
determine a plurality of switching frequencies and associated phase shifts for the plurality of VRs comprising the master VR and the at least one slave VR, the switching frequencies and associated phase shifts determined such that each of the plurality of VRs switch at different times from each other; and
transmit, to each of the slave VRs from the master VR controller, the associated phase shifts.

8. The power control system of claim 7, wherein the VR synchronization firmware further configures the master VR controller to:
assign slave VRs identified by the master/slave configuration data as the slave VRs; and
transmit slave assignments to at least one of the VRs to assign the VR as a slave VR.

9. The power control system of claim 7, wherein a first slave VR includes a first VR controller, the first VR controller configured to:
receive a first phase shift for the first slave VR;
determine a first switching frequency for the first slave VR; and
operate the first slave VR at the first switching frequency and the first phase shift.

10. The power control system of claim 7, wherein the VR synchronization firmware further configures the master VR controller to transmit, via a common clock bus, a common clock signal to each of the slave VRs.

11. The power control system of claim 7, wherein a first slave VR controller associated with a first slave VR operates to:
determine if a common clock signal has failed; and
in response to the common clock signal having failed, self-assigning the first slave VR as a new master VR.

12. An information handling system (IHS) comprising:
at least one processor; and
a power subsystem communicatively coupled to the processor and to functional components of the IHS, the power subsystem including a master voltage regulator (VR), at least one slave VR, and a board management controller (BMC), the master VR communicatively coupled to the at least one slave VR and the BMC, the master VR further including a master VR controller, the master VR controller having VR synchronization firmware executing thereon that configures the master VR controller to:
receive, from a non-volatile (NV) memory of the BMC, master/slave configuration data for one or more of the plurality of VRs via a digital communication interface and clock signal/phase data via a common clock bus, the master/slave configuration data identifying one of the plurality of VRs as a master VR and each other VR as a slave VR, and the master VR controller assigning, as the master VR, the one VR identified by the master/slave configuration data as the master VR;
determine a plurality of switching frequencies and associated phase shifts for the plurality of VRs comprising the master VR and the at least one slave VR, the switching frequencies and associated phase shifts determined such that each of the plurality of VRs switch at different times from each other; and
transmit, to each of the slave VRs from the master VR controller, the associated phase shifts.

13. The information handling system of claim 12, wherein the VR synchronization firmware further configures the master VR controller to:
assign slave VRs identified by the master/slave configuration data as the slave VRs; and
transmit slave assignments to at least one of the VRs to assign the VR as a slave VR.

14. The information handling system of claim 12, wherein a first slave VR includes a first VR controller, the first VR controller configured to:
receive a first phase shift for the first slave VR;
determine a first switching frequency for the first slave VR; and
operate the first slave VR at the first switching frequency and the first phase shift.

15. The information handling system of claim 12, wherein the VR synchronization firmware further configures the master VR controller to transmit a common clock signal, via a common clock bus, to each of the slave VRs.

16. The information handling system of claim 12, wherein a first slave VR controller associated with a first slave VR operates to:
determine if a common clock signal has failed; and
in response to the common clock signal having failed, self-assigning the first slave VR as a new master VR.

* * * * *